US012129316B2

United States Patent
De-Gaudemaris et al.

(10) Patent No.: US 12,129,316 B2
(45) Date of Patent: Oct. 29, 2024

(54) RUBBER COMPOSITION BASED ON A MODIFIED DIENE ELASTOMER

(71) Applicant: COMPAGNIE GENERALE DES ETABLISSEMENTS MICHELIN, Clermont-Ferrand (FR)

(72) Inventors: Benoît De-Gaudemaris, Clermont-Ferrand (FR); Julien Chatard, Clermont-Ferrand (FR); Charlotte Dire, Clermont-Ferrand (FR); Kevin Roos, Clermont-Ferrand (FR); Benoît Gadenne, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 722 days.

(21) Appl. No.: 17/291,640

(22) PCT Filed: Nov. 7, 2019

(86) PCT No.: PCT/FR2019/052641
§ 371 (c)(1),
(2) Date: May 6, 2021

(87) PCT Pub. No.: WO2020/094988
PCT Pub. Date: May 14, 2020

(65) Prior Publication Data
US 2021/0403609 A1 Dec. 30, 2021

(30) Foreign Application Priority Data

Nov. 8, 2018 (FR) ...................................... 1860302

(51) Int. Cl.
*C08C 19/25* (2006.01)
*B60C 1/00* (2006.01)
*B60C 11/00* (2006.01)
*C08C 19/22* (2006.01)
*C08C 19/44* (2006.01)
*C08F 236/06* (2006.01)
*C08F 236/10* (2006.01)
*C08L 15/00* (2006.01)

(52) U.S. Cl.
CPC ............ *C08C 19/25* (2013.01); *B60C 1/0016* (2013.01); *B60C 11/0008* (2013.01); *C08C 19/22* (2013.01); *C08C 19/44* (2013.01); *C08F 236/06* (2013.01); *C08F 236/10* (2013.01); *C08L 15/00* (2013.01); *B60C 2011/0025* (2013.01)

(58) Field of Classification Search
CPC ......... C08C 19/25; C08C 19/44; C08C 19/22; C08F 236/06; C08F 236/10; C08L 15/00; B60C 1/0016; B60C 11/0008; B60C 2011/0025
See application file for complete search history.

(56) References Cited

U.S. PATENT DOCUMENTS

| 5,115,034 A * | 5/1992 | Silver ................. C08F 297/046 525/274 |
| 11,207,918 B2 | 12/2021 | Kyo et al. |
| 2008/0154020 A1* | 6/2008 | Yan ......................... C08L 15/00 528/422 |
| 2016/0159957 A1 | 6/2016 | Choi et al. |
| 2016/0194411 A1 | 7/2016 | Lee et al. |

FOREIGN PATENT DOCUMENTS

| EP | 2003146 | * 12/2008 |
| JP | 2020059778 A | 4/2020 |
| WO | 2018034195 A1 | 6/2019 |

OTHER PUBLICATIONS

Odian, George, Principles of Polymerization, Third Edition, John Wiley & Sons, Inc., 1991, pp. 19-24.*
International Search Report with translation and Written Opinion corresponding to PCT/FR2019/052641 dated Jun. 8, 2020.

* cited by examiner

*Primary Examiner* — Patrick D Niland
(74) *Attorney, Agent, or Firm* — Dickinson Wright PLLC

(57) ABSTRACT

A rubber composition based at least on a reinforcing filler comprising a content of silica of greater than or equal to 80 phr, preferably of greater than or equal to 100 phr, and on an elastomer matrix comprising a content of a modified diene elastomer of greater than or equal to 75 phr is provided. The modified diene elastomer comprises macromolecules comprising, within their structure, an n-functional branching unit, n having a value of at least 1 and of at most 9, preferably of at most 6, consisting of a group comprising at least two silicon atoms which are substituted by elastomer branches and connected together via a group comprising at least one nitrogen atom, the bonds between silicon and nitrogen atoms being produced via a spacer group.

14 Claims, No Drawings

RUBBER COMPOSITION BASED ON A MODIFIED DIENE ELASTOMER

This application is a 371 national phase entry of PCT/FR2019/052641 filed on 7 Nov. 2019, which claims benefit of French Patent Application No. 1860302, filed 8 Nov. 2018, the entire contents of which are incorporated herein by reference for all purposes.

BACKGROUND

1. Technical Field

The invention relates to a rubber composition comprising a modified diene elastomer and silica as reinforcing filler.

2. Related Art

Now that savings in fuel and the need to protect the environment have become a priority, it is desirable to produce mixtures having a hysteresis which is as low as possible in order to be able to process them in the form of rubber compositions which can be used in the manufacture of various semi-finished products participating in the composition of tires, such as, for example, underlayers, sidewalls or treads, and in order to obtain tires having a reduced rolling resistance.

Ideally, for example, a tire tread must fulfil a great many technical requirements, which are often contradictory in nature, including a high wear resistance while affording the tire a low rolling resistance.

Moreover, the reduction in the hysteresis of the mixtures, evidence of a reduction in the rolling resistance, must also be achieved while keeping intact the suitability for processing, in particular in the raw state, of the mixtures, while maintaining the creep strength of the elastomers.

Numerous solutions have already been experimented with in order to achieve the objective of a fall in hysteresis. Mention may in particular be made of the modification of the structure of diene polymers and copolymers at the end of polymerization by means of functionalization agents, coupling agents or star-branching agents with the aim of obtaining a good interaction between the polymer, thus modified, and the filler, whether this is carbon black or a reinforcing inorganic filler.

Within the context of mixtures containing a reinforcing inorganic filler, such as silica, provision has been made to use diene polymers functionalized by alkoxysilane derivatives, in particular by combining, or not combining functionalization by alkoxysilane functional groups with functionalization by other functional groups, in particular amine, imine, epoxy or also thiol functional groups.

Functionalization by alkoxysilane compounds bearing an amino functional group has been widely described in the patent literature. Elastomers functionalized at the chain end by alkoxysilane functional groups bearing an amino group have been combined equally well with silica and with carbon black, indeed even a mixture of these two fillers, in rubber compositions intended for the manufacture of tires.

The Applicant Company has for its part described, in the document WO 2009133068 A1, a functionalized diene elastomer essentially composed of the coupled entity of an elastomer having, within the chain, a group bearing an alkoxysilane functional group and an amine functional group, the silicon atom of this group bonding the two parts of the diene elastomer chain. This elastomer functionalized in the middle of the chain confers improved mechanical and dynamic properties on the composition in which it is present, in particular an improved hysteresis, while retaining a satisfactory raw processing, for the purpose in particular of use as tire tread.

The documents EP 2 003 146 A2 and US 2014/0243476A1 describe diene elastomers modified with functionalization agents having both at least one silicon atom and at least one nitrogen atom. JP 2016017097A describes diene elastomers modified with functionalization agents having both at least one silicon atom and at least one nitrogen atom, bearing an amino functional group at the end of the chains not bonded to the functionalization agent. These documents provide for improving the mechanical and dynamic properties of rubber compositions having low contents of reinforcing fillers and intended for a tire application, and in particular highlighting gains in wet grip, an improvement in heat dissipation, gains in rolling resistance or abrasion resistance.

In order to achieve certain performance qualities of the tire, it may prove to be necessary to use more or less reinforcing filler in the rubber compositions which make up the different parts of the tire. In point of fact, the use of a large amount of filler to achieve some of these performance qualities conflicts, however, with the desired fall in the rolling resistance. This is because the use of a high content of reinforcing filler in the mixture used to manufacture the tread is frequently disadvantageous, if appropriate often in a prohibitive manner, to the rolling resistance properties, being accompanied by a significant increase in hysteresis losses of the rubber composition.

The technical problem which the present invention proposes to solve is that of weakening the effect of the increase in the content of reinforcing filler on the dynamic properties of the rubber compositions and their processing with a view to use of these compositions for the manufacture of tires having a reduced rolling resistance.

SUMMARY

On continuing its research studies, the Applicant Company has discovered that the use of certain specific modified diene elastomers in rubber compositions makes it possible to reduce the impact of the increase in the content of reinforcing fillers on the processing/hysteresis compromise. It is thus possible to provide tire rubber compositions comprising a high content of reinforcing fillers while minimizing the effect of this high content on the hysteresis and processing properties of the compositions.

A subject-matter of the invention is thus a rubber composition based at least on a reinforcing filler comprising silica and on an elastomer matrix comprising a modified diene elastomer, characterized in that:
  the content of silica is greater than or equal to 80 phr,
  the content of modified diene elastomer is greater than or equal to 75 phr, and
  the modified diene elastomer comprises macromolecules comprising, within their structure, an n-functional branching unit, n having a value of at least 1, preferably of at least 3 and of at most 9, preferably of at most 6, consisting of a group comprising at least two silicon atoms which are substituted by elastomer branches and connected together via a group comprising at least one nitrogen atom, the bonds between silicon and nitrogen atoms being produced via a spacer group.

DETAILED DESCRIPTION

In the present description, unless expressly indicated otherwise, all the percentages (%) shown are % by weight.

Furthermore, any interval of values denoted by the expression "between a and b" represents the range of values extending from more than a to less than b (that is to say, limits a and b excluded), while any interval of values denoted by the expression "from a to b" means the range of values extending from a up to b (that is to say, including the strict limits a and b). In the present document, when an interval of values is denoted by the expression "from a to b", the interval represented by the expression "between a and b" is also denoted.

The expression composition "based on" should be understood as meaning a composition comprising the mixture and/or the reaction product of the various constituents used, some of these base constituents being capable of reacting or intended to react with one another, at least in part, during the various phases of manufacture of the composition, in particular during its crosslinking or vulcanization.

In the present description, the abbreviation "phr" means parts by weight per hundred parts by weight of elastomers present in the elastomer matrix, the elastomer matrix denoting all of the elastomers present in the rubber composition.

In the present patent application, "predominantly" or "predominant", in connection with a compound, is understood to mean that this compound is predominant among the compounds of the same type in the composition, that is to say that it is that which represents the biggest fraction by weight among the compounds of the same type. Thus, a "predominant" functional entity of a modified diene elastomer is that representing the biggest fraction by weight among the functionalized entities constituting the diene elastomer, with respect to the total weight of the modified diene elastomer. In a system comprising just one compound of a certain type, the latter is predominant within the meaning of the present invention.

In the present description, Mooney viscosity is understood to mean the ML(1+4) 100° C. Mooney viscosity of a compound, in particular of the modified diene elastomer of the invention, measured according to Standard ASTM D1646.

In the present description, when no further information is given, primary or secondary amine is understood to mean a primary or secondary amine which is or is not protected by a protective group known to a person skilled in the art.

In the present description, modified diene elastomer is understood to mean a mixture of macromolecules resulting from the functionalization reaction of a living diene elastomer with a compound comprising at least six functional groups which are reactive with respect to the reactive end of the living diene elastomer, this compound comprising several heteroatoms, including at least two silicon atoms and at least one nitrogen atom.

A person skilled in the art will understand that a modification reaction with an agent comprising more than one functional group reactive with respect to the living elastomer results in a mixture of macromolecules functionalized at the chain end and in the middle of the chain (also called coupled), constituting the functional linear entities of the modified elastomer, and of macromolecules having at least three branches and at most as many branches as reactive functional groups borne by the functionalization agent, constituting the branched macromolecules of the modified elastomer. Depending on the operating conditions, mainly the molar ratio of the functionalization agent to the living chains and the number of its reactive functional groups, certain entities of macromolecules are more or less present, indeed even predominant, in the mixture.

In the present description, the expression "monomer unit", whether it is diene or other, is understood as a repeat unit of the polymer resulting from the monomer in question.

In the present description, the expression "branching unit" is understood as a non-repeating unit (there is just one of them in the polymer), resulting from the functionalization agent with which the living diene elastomer chain(s) have reacted and from which the diene elastomer chain(s) emanate.

It should be noted that, in the context of the invention, the monomers used for the synthesis of the modified diene elastomer, as well as the compounds of the rubber composition, can be of fossil or biobased origin. In the latter case, they may partially or completely result from biomass or be obtained from renewable starting materials resulting from biomass.

Thus, the invention relates to a rubber composition based at least on a reinforcing filler comprising silica and on an elastomer matrix comprising a modified diene elastomer, characterized in that:
    the content of silica is greater than or equal to 80 phr,
    the content of modified diene elastomer is greater than or equal to 75 phr, and
    the modified diene elastomer comprises macromolecules comprising, within their structure, an n-functional branching unit, n having a value of at least 1, preferably of at least 3 and of at most 9, preferably of at most 6, consisting of a group comprising at least two silicon atoms which are substituted by elastomer branches and connected together via a group comprising at least one nitrogen atom, the bonds between silicon and nitrogen atoms being produced via a spacer group.

Diene elastomer capable of being used as the modified diene elastomer in the compositions in accordance with the invention should be understood in a known way as meaning a synthetic elastomer constituted at least in part by conjugated or non-conjugated diene monomer units.

Synthetic diene elastomer is understood more particularly to mean:
    (a) any homopolymer of a diene monomer, particularly a conjugated diene monomer, in particular any homopolymer obtained by polymerization of a conjugated diene monomer having from 4 to 12 carbon atoms;
    (b) any copolymer obtained by copolymerization of one or more diene monomers with one another or with one or more vinylaromatic monomers.

In the case of copolymers (b), the latter contain from 20% to 99% by weight of diene units and from 1% to 80% by weight of units resulting from vinylaromatic monomers.

The following are suitable in particular as conjugated dienes: 1,3-butadiene, 2-methyl-1,3-butadiene (isoprene), 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene or 2,4-hexadiene. Preferably, the conjugated diene is a derivative of 1,3-butadiene, more preferably 1,3-butadiene.

The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene. Preferably, the vinylaromatic compound is styrene.

Preferentially, the diene elastomer is selected from the group consisting of polybutadienes (BRs), synthetic polyisoprenes (IRs), butadiene copolymers, isoprene copolymers and the mixtures of these elastomers. Such copolymers are more preferentially selected from the group consisting of butadiene/styrene copolymers (SBRs), isoprene/butadiene copolymers (BIRs), isoprene/styrene copolymers (SIRs) and isoprene/butadiene/styrene copolymers (SBIRs), more particularly butadiene/styrene copolymers (SBRs).

The diene elastomers can have any microstructure which depends on the polymerization conditions used.

The diene elastomers can be block, random, sequential, microsequential, and the like, elastomers.

According to the invention, the modified diene elastomer is a mixture of macromolecules comprising, within their structure, an n-functional branching unit, n having a value for each macromolecule, independently of one another, of at least 1 and of at most 9, preferably of at most 6. The branching unit consists of a group comprising at least two silicon atoms which are substituted by elastomer branches and connected together via a group comprising at least one nitrogen atom, the bonds between silicon and nitrogen atoms being produced via a spacer group.

According to one embodiment of the invention, the number-average molar mass of the elastomer branches of the modified diene elastomer is less than 150 000 g/mol, preferentially from 40 000 g/mol to 100 000 g/mol.

According to one embodiment of the invention, the end of the elastomer branches of the modified diene elastomer, which end is not bonded to a silicon atom, can bear a functional group comprising a nitrogen atom, preferably a cyclic or acyclic amine functional group. Preferably, the ends of elastomer branches of the modified diene elastomer are functionalized to at least 70 mol %, with respect to the number of moles of elastomer branches, by a cyclic or acyclic amine functional group.

According to one embodiment of the invention, the modified diene elastomer comprises macromolecules comprising, in their structure, at least two silicon atoms each substituted by at most three elastomer branches and by at most three hydroxyl or alkoxy groups.

The alkoxy groups substituting the silicon atom can, according to some alternative forms of the invention, be partially or completely hydrolysed to give hydroxyl groups. According to these alternative forms, preferentially at least 50 mol % of the alkoxy groups borne by the modified diene elastomer are hydrolysed to give hydroxyl groups. In particular, at least 80 mol % of the alkoxy functional groups borne by the modified diene elastomer are hydrolysed to give hydroxyl groups, indeed even 100%.

The alkyl radicals of the alkoxy groups substituting the silicon atoms are, independently of one another, chosen from $C_1$-$C_{10}$, indeed even $C_1$-$C_8$, alkyl radicals, preferably from $C_1$-$C_4$ alkyl radicals, more preferentially from methyl and ethyl.

According to the invention, the branching unit comprises at least two silicon atoms, these atoms being connected together via a group comprising at least one nitrogen atom, the bonds between silicon and nitrogen atoms being produced via a spacer group. This spacer group can be defined as being a saturated or unsaturated, cyclic or non-cyclic, divalent aliphatic $C_1$-$C_{18}$ hydrocarbon radical or a divalent aromatic $C_6$-$C_{18}$ hydrocarbon radical, preferably a linear or branched divalent aliphatic $C_1$-$C_{10}$ hydrocarbon radical. Preferably, this spacer group is a saturated and linear divalent aliphatic group having from 1 to 8 carbon atoms, preferentially 3 to 8 carbon atoms.

According to the invention, the branching unit is n-functional, that is to say that n diene elastomer branches are bonded to this unit with n having a value of at least 1 and preferably of at most 9, more preferably of at most 6.

According to an advantageous embodiment of the invention, the n-functional branching unit comprises two silicon atoms which are substituted by elastomer branches and which are connected together via a divalent group comprising at least one nitrogen atom, preferably via a group comprising a nitrogen atom, the bonds between silicon and nitrogen atoms being produced via a spacer group.

According to one embodiment of the invention, the n-functional branching unit comprises three silicon atoms which are substituted by elastomer branches and which are connected together via a trivalent group comprising at least one nitrogen atom, preferably via a group comprising a nitrogen atom, the bonds between silicon and nitrogen atoms being produced via a spacer group.

The various alternative forms, preferential or not, concerning the spacer group, the number of elastomer branches or the substitution of the silicon atoms by alkoxy groups can be combined with the two preceding embodiments of the invention, that is to say an n-functional branching unit comprising two silicon atoms and an n-functional branching unit comprising three silicon atoms.

The macromolecules of the modified diene elastomer of the invention correspond very particularly to the following formula I:

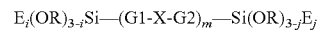

in which:

E represents a diene elastomer branch;

the R radicals represent, independently of one another, a $C_1$-$C_{10}$, indeed even $C_1$-$C_8$, alkyl radical, preferably a $C_1$-$C_4$ alkyl radical, more preferentially methyl or ethyl, or a hydrogen atom;

G1 and G2 represent, independently of one another, a saturated or unsaturated, linear or branched, cyclic or non-cyclic, divalent aliphatic $C_1$-$C_{18}$, preferably $C_1$-$C_{10}$, hydrocarbon radical, more preferentially a saturated and linear divalent aliphatic $C_3$-$C_8$ hydrocarbon radical, or a divalent aromatic $C_6$-$C_{18}$ hydrocarbon radical;

X represents a group comprising at least one nitrogen atom;

i and j are, independently of one another, integers varying from 0 to 3, with i+j equal to at least 1, m is an integer varying from 1 to 20, preferentially 1.

According to alternative forms of the invention, X represents a group of formula II:

with Y representing a $C_1$-$C_4$ alkyl radical, preferably methyl or ethyl, or a $C_6$-$C_{18}$, preferably $C_6$, aryl radical, or a hydrogen atom, or an -R1-A group, with R1 representing a linear or branched divalent hydrocarbon group having 1 to 18 carbon atoms and A being a group comprising a nitrogen atom.

According to other alternative forms of the invention, X represents a group of formula III:

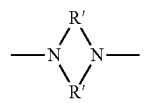

with the R' groups, which are identical or different, representing a linear or branched divalent aliphatic $C_1$-$C_{18}$ radical, preferably methylene or ethylene.

According to still other alternative forms of the invention, the macromolecules of the modified diene elastomer correspond to the formula I in which X represents a group of formula IV:

$$>N-G3-SiR''_a E_k(OR)_{3-a-k}$$

with
G3 representing a saturated or unsaturated, linear or branched, cyclic or non-cyclic, divalent aliphatic $C_1$-$C_{18}$, preferably $C_1$-$C_{10}$, hydrocarbon radical, more preferentially a saturated and linear divalent aliphatic $C_3$-$C_8$ hydrocarbon radical, or a divalent aromatic $C_6$-$C_{18}$ hydrocarbon radical,
R" representing a $C_1$-$C_4$ alkyl radical, preferably methyl or ethyl,
the R radicals representing, independently of one another, a $C_1$-$C_{10}$, indeed even $C_1$-$C_8$, alkyl radical, preferably a $C_1$-$C_4$ alkyl radical, more preferentially methyl or ethyl,
a representing an integer having the value 0 or 1 and k an integer varying from 0 to 3, with a+k less than or equal to 3, with the proviso that i+j+k is at least equal to 1 and at most to 9, preferably at most to 8, more preferentially at most to 7 and more preferentially still at most to 6.

According to the invention, the macromolecules of the modified diene elastomer preferentially correspond to the formula I in which m has the value 1.

According to the invention, the macromolecules of the modified diene elastomer preferentially correspond to formula I in which m has the value 1 and X represents a group as described above in the various alternative forms.

More preferentially still, the macromolecules of the modified diene elastomer correspond very particularly to the formula I in which m has the value 1 and X represents a>N—Y group, with Y representing a $C_1$-$C_4$ alkyl radical, preferably methyl or ethyl, in particular methyl.

According to alternative forms of the invention which can be combined with the preceding ones, E represents a diene elastomer branch bearing at the chain end a group comprising a nitrogen atom, more particularly a cyclic or acyclic amine functional group.

According to the invention, the branched macromolecules consist of all the macromolecules, the branching points of which are bonded to at least three diene elastomer blocks, i.e. the mixture constituted by the macromolecules having three, four, five and six branches, and if appropriate macromolecules having seven, eight and nine branches, indeed even more still. For reasons of technical reality and feasibility, these macromolecules preferably exhibit a distribution of the diene elastomer blocks on either side of the branching unit, on the silicon atoms. That is to say that not all the elastomer branches are bonded to the same branching point but are distributed over the silicon atoms. Thus, the three-branched macromolecules can comprise two elastomer branches at one end of the branching unit and one elastomer branch at the other end, the four-branched macromolecules can comprise two elastomer branches at one end of the branching unit and two elastomer branches at the other end or three elastomer branches at one end of the branching unit and one elastomer branch at the other end, and so on.

According to an advantageous alternative form of the invention, the content by weight of the branched macromolecules is at least 30%, preferably at least 35%, with respect to the total weight of the modified diene elastomer.

The modified diene elastomer, according to a particularly preferred alternative embodiment of the invention, comprises at least 50% by weight of branched macromolecules, with respect to the total weight of the modified diene elastomer, preferably at least 80% by weight.

To illustrate this alternative form by referring to the formula I according to the preferential alternative form according to which m has the value 1, the reader will understand that, when the macromolecules of the modified diene elastomer correspond to the formula I, at least 50% by weight of macromolecules, with respect to the total weight of the modified diene elastomer, preferably at least 80% by weight, correspond to the formula I with i+j equal to at least 3 or, depending on the scenario, i+j+k equal to at least 3.

The modified diene elastomer according to another preferred alternative embodiment of the invention, which can be combined with the previous alternative form, comprises at least 35% by weight of branched macromolecules having three branches, with respect to the total weight of the modified diene elastomer, preferably at least 40%.

To illustrate this alternative form by referring to the formula I according to the preferential alternative form according to which m has the value 1, the reader will understand that, when the macromolecules of the modified diene elastomer correspond to the formula I, at least 35% by weight of macromolecules, with respect to the total weight of the modified diene elastomer, preferably at least 40% by weight, correspond to the formula I with i+j equal to 3 or, depending on the scenario, i+j+k equal to 3.

The modified diene elastomer according to another preferred alternative embodiment of the invention, which can be combined with one or other of the two preceding alternative forms or with the combination of the two, comprises at most 25% by weight of branched macromolecules having four and more branches, with respect to the total weight of the modified diene elastomer.

To illustrate this alternative form by referring to the formula I according to the preferential alternative form according to which m has the value 1, the reader will understand that, when the macromolecules of the modified diene elastomer correspond to the formula I, at most 25% by weight of macromolecules, with respect to the total weight of the modified diene elastomer, correspond to the formula I with i+j equal to at least 4 or, depending on the scenario, i+j+k equal to at least 4.

The various preferential alternative forms and aspects concerning the nature of the modified diene elastomer, the functionalization of the elastomer branches, their Mn, the alkoxy functional group, the number of silicon atoms, the spacer group and the group comprising at least one nitrogen atom, the content of branched macromolecules, the content of three-branched macromolecules, and the like, can be combined with one another, subject to their compatibility.

According to advantageous alternative forms of the invention, the modified diene elastomer comprising within its structure a branching unit comprising at least two silicon atoms which are connected together via a group comprising at least one nitrogen atom, the bonds between silicon and nitrogen atoms being produced via a spacer group, is such that at least one, at least two, at least three, at least four, at least five, at least six, at least seven, at least eight, at least nine and preferably all of the following characteristics is/are observed:
the macromolecules making up the modified diene elastomer comprise two silicon atoms and one nitrogen atom,
the group comprising the nitrogen atom is a nitrogen atom substituted by a $C_1$-$C_4$ alkyl radical, preferably methyl or ethyl, in particular methyl, the spacer groups are saturated and linear divalent aliphatic radicals having from 3 to 8 carbon atoms,
the alkoxy group(s) substituting one or more silicon atoms comprises 1 to 4 carbon atoms; preferably, it is a methoxy radical or an ethoxy radical,
all or a part, preferably at least 50 mol %, of the alkoxy functional groups substituting one or more silicon atoms are hydrolysed to give hydroxyl groups,
the diene elastomer is a butadiene/styrene copolymer,
all or a part, preferably at least 70 mol %, of the ends of elastomer branches not bonded to a silicon atom are functionalized, with respect to the number of moles of chain end, by an amine functional group,
the mean Mn of the elastomer branches is less than 150 000 g/mol, preferably from 40 000 to 100 000 g/mol,
the modified diene elastomer comprises at least 50% by weight of branched macromolecules having at least three branches,
the modified diene elastomer comprises at least 35% by weight of branched macromolecules having three branches.

According to these advantageous alternative forms of the invention, the modified diene elastomer can comprise, according to a preferential aspect, at most 25% by weight of branched macromolecules having four and more branches.

The modified diene elastomer according to the invention can be obtained according to a synthesis process comprising the reaction of a living diene elastomer, resulting from the polymerization of at least one diene monomer, with a specific functionalization agent chosen from molecules comprising at least two trialkoxysilyl or trihalosilyl groups, the trialkoxysilyl or trihalosilyl groups being connected together via a group comprising at least one nitrogen atom, the bonds between silicon and nitrogen atoms being produced via a spacer group.

Another subject-matter of the invention is a rubber composition based at least on a reinforcing filler comprising a content of silica of greater than or equal to 80 phr, preferably of greater than or equal to 100 phr, and on an elastomer matrix comprising a content of a modified diene elastomer of greater than or equal to 75 phr, the modified diene elastomer being obtained by this synthesis process, including its specific, advantageous and preferential aspects described below.

The polymerization stage can be carried out conventionally, in particular by anionic polymerization initiated, for example, by means of an organic compound of an alkali metal or alkaline earth metal. The polymerization of at least one conjugated diene monomer generates elastomer chains having a reactive site at the chain end. The term then commonly used is living elastomer or living chain.

In the context of an anionic polymerization, the polymerization initiator can be any known anionic initiator. However, an initiator containing an alkali metal, such as lithium, or an alkaline earth metal, such as barium, is preferably used. An initiator containing an alkali metal, such as lithium, is preferably used. Suitable organolithium initiators are in particular those comprising at least one carbon-lithium bond or at least one nitrogen-lithium bond. Representative compounds are aliphatic organolithium compounds, such as ethyllithium, n-butyllithium (n-BuLi) or isobutyllithium, and lithium amides obtained from a cyclic secondary amine, such as pyrrolidine and hexamethyleneimine. Such anionic polymerization initiators are known to a person skilled in the art.

The polymerization can be carried out in a way known per se. The polymerization is generally carried out at temperatures of between 0° C. and 110° C. and preferably from 40° C. to 100° C., indeed even from 50° C. to 90° C. The polymerization process can be carried out in solution, in a more or less concentrated or dilute medium. The polymerization solvent is preferably an inert hydrocarbon solvent which can, for example, be an aliphatic or alicyclic hydrocarbon, such as pentane, hexane, heptane, isooctane, cyclohexane or methylcyclohexane, or an aromatic hydrocarbon, such as benzene, toluene or xylene.

The monomers which can be used in the context of the invention are described above.

In order to refine the microstructure of the diene elastomers, a modifying and/or randomizing agent may or may not be added in appropriate amounts This is within the general knowledge of a person skilled in the art.

These alternative forms concerning the polymerization stage can be combined with the preferential or alternative and aspects and alternative forms described below.

The polymerization of at least one conjugated diene monomer generates living elastomer chains. These living chains, or living elastomers, subsequently react with the modifying agent during the modification stage. The modifying agent comprises at least one group reactive with respect to the reactive site of the elastomer, in this case alkoxy groups or halogen atoms substituting the silicon atoms.

The amount of modifying agent intended to react with the living diene elastomer depends essentially on the type of modified diene elastomer desired. In general, the molar ratio of the modifying agent to the metal of the polymerization initiator is at least 0.1, preferably at least 0.15, more preferentially at least 0.25, and at most 0.45, preferentially at most 0.40, indeed even at most 0.35. Thus, according to a particularly advantageous alternative form of the modification stage, the molar ratio of the functionalization agent to the metal of the polymerization initiator has a value within a range extending from 0.25 to 0.40.

The conditions for addition of the modifying agent to and for reaction of the modifying agent with the elastomer are conventional as regards modification in anionic polymerization using alkoxysilane or halosilane compounds and are known to a person skilled in the art. These conditions do not comprise specific limitations.

For example, this reaction with the living diene elastomer can take place at a temperature of between −20° C. and 100° C., by addition of the functionalization agent to the living elastomer chains, or vice versa. This reaction can, of course, be carried out with one or more different functionalization agents.

The blending of the living elastomer with the functionalization agent can be carried out by any suitable means, in particular using any mixer having available stirring of static type and/or any dynamic mixer of perfectly stirred type known to a person skilled in the art. The latter determines the reaction time between the living diene polymer and the functionalization agent, which can vary from a few minutes, for example 2 minutes, to several hours, for example 2 hours.

According to alternative forms of the invention, the modifying agent is chosen from the silane compounds corresponding to the formula V:

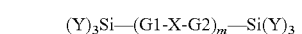

in which:

Y represent either a halogen atom, in particular chlorine, or an alkoxy group OR, R representing, independently of one another, a $C_1$-$C_4$ alkyl radical, preferably methyl or ethyl, G1 and G2 represent, independently of one another, a saturated or unsaturated, linear or branched, cyclic or non-cyclic, divalent aliphatic $C_1$-$C_{18}$, preferably $C_1$-$C_{10}$, hydrocarbon radical, more preferentially a saturated and linear divalent aliphatic $C_3$-$C_8$ hydrocarbon radical, or a divalent aromatic $C_6$-$C_{18}$ hydrocarbon radical;

X represents a group comprising at least one nitrogen atom, m is an integer ranging from 1 to 20.

According to alternative forms of the invention, X represents a group of formula VI:

with Y representing a $C_1$-$C_4$ alkyl radical, preferably methyl or ethyl, or a $C_6$-$C_{18}$, preferably $C_6$, aryl radical, or a trialkylsilyl radical, or an -R1-A group, with R1 representing a linear or branched divalent hydrocarbon group having 1 to 18 carbon atoms and A being a group comprising a nitrogen atom.

Mention may be made, for example, as molecules, the functional group X of which represents a>N—Y group, with Y representing a $C_1$-$C_4$ alkyl radical, or a $C_6$ aryl radical, or a trialkylsilyl radical, of the compounds bis(triethoxysilylalkyl)methylamine, bis(triethoxysilylalkyl)ethylamine, bis(triethoxysilylalkyl)propylamine, bis(triethoxysilylalkyl)butylamine, bis(triethoxysilylalkyl)phenylamine, and the trimethoxysilyl compounds corresponding to these triethoxysilyl compounds, the compounds bis(trimethoxysilylalkyl)-N-trimethylsilylamine, bis(triethoxysilylalkyl)-N-trimethylsilylamine, in which the alkyl radical is $C_1$-$C_{10}$, preferably $C_3$-$C_8$.

Mention may be made, for example, as molecules, the functional group X of which represents a>N—Y group, with Y representing a -R1-A group, with R1 representing a linear or branched divalent hydrocarbon group having 1 to 18 carbon atoms and A being a group comprising a nitrogen atom, of the compounds bis(triethoxysilylalkyl)(3-methylaminopropyl)amine, bis(triethoxysilylalkyl)(3-hexamethylenaminopropyl)amine, bis(triethoxysilylalkyl)(3-imidazolylpropyl)amine, bis(triethoxysilylalkyl)(3-dihydroimidazolylpropyl)amine, and the trimethoxysilyl compounds corresponding to these triethoxysilyl compounds, in which the alkyl radical is $C_1$-$C_{10}$, preferably $C_3$-$C_8$.

According to still other alternative forms of the invention, X represents a group of formula VII:

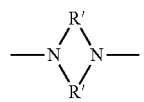

with the R' groups, which are identical or different, representing a linear or branched divalent aliphatic $C_1$-$C_{18}$ group, preferably methylene or ethylene.

Mention may be made, for example, as molecule, the functional group X of which represents a group of formula II, of the compounds bis(trimethoxysilylalkyl)piperazine, bis(triethoxysilylalkyl)piperazine, bis(trimethoxysilylalkyl)imidazolidine, bis(triethoxysilylalkyl)imidazolidine, bis(trimethoxysilylalkyl)hexahydropyrimidine, bis(triethoxysilylalkyl)hexahydropyrimidine, in which the alkyl radical is $C_1$-$C_{10}$, preferably $C_3$-$C_8$.

According to other alternative forms of the invention, X represents a group of formula VIII:

with

G3 representing a saturated or unsaturated, linear or branched, cyclic or non-cyclic, divalent aliphatic $C_1$-$C_{18}$, preferably $C_1$-$C_{10}$, hydrocarbon radical, more preferentially a saturated and linear divalent aliphatic $C_3$-$C_8$ hydrocarbon radical, or a divalent aromatic $C_6$-$C_{18}$ hydrocarbon radical, R" representing a $C_1$-$C_4$ alkyl radical, preferably methyl or ethyl, the R radicals representing, independently of one another, a $C_1$-$C_4$ alkyl radical, preferably methyl or ethyl, a having the value 0 or 1.

Mention may be made, for example, as molecules, the functional group X of which represents a-N-G3-SiR"(OR)$_2$ group, of the compounds bis(triethoxysilylalkyl)diethoxymethylsilylalkylamine, bis(triethoxysilylalkyl)diethoxyethylsilylalkylamine, in which the alkyl radical is $C_3$-$C_8$, and also of the trimethoxy compounds and the dimethoxy compounds corresponding to these compounds.

Mention may be made, for example, as molecules, the functional group X of which represents a-N-G3-Si(OR)$_3$ group, of the compounds tris(triethoxysilylalkyl)amine, tris(trimethoxysilylalkyl)amine, in which the alkyl radical is $C_1$-$C_{10}$, preferably $C_3$-$C_8$.

According to preferential alternative forms of the invention, which can be combined with each of the preceding alternative forms concerning the representation of X and those concerning the representations of G1 and G2, m has the value 1.

According to particularly preferred alternative forms of the invention, the molecules according to the invention correspond to the formula IV in which the R radicals represent a methyl or ethyl radical, X represents a>N—Y group, with Y representing a $C_1$-$C_4$ alkyl radical, preferably methyl or ethyl, G1 and G2 both represent a saturated or unsaturated, linear or branched, cyclic or non-cyclic, divalent aliphatic $C_1$-$C_{18}$, preferably $C_1$-$C_{10}$, hydrocarbon group, more preferentially a saturated and linear divalent aliphatic $C_3$-$C_8$ hydrocarbon group, and m has the value 1.

Mention may be made, among these preferred molecules, for example, of bis(3-triethoxysilylpropyl)methylamine, bis(3-triethoxysilylpropyl)ethylamine, bis(3-triethoxysilylpropyl)propylamine, bis(3-triethoxysilylpropyl)butylamine, and the trimethoxysilyl compounds corresponding to these triethoxysilyl compounds, the compounds bis(3-trimethoxysilylpropyl)-N-trimethylsilylamine, bis(3-triethoxysilylpropyl)-N-trimethylsilylamine.

On conclusion of these polymerization and functionalization stages, the process for the synthesis of the modified diene elastomer according to the invention can be continued in a way known per se by the stages of recovery of the modified elastomer.

In accordance with the invention, the rubber composition comprises an elastomer matrix comprising at least 75 phr of modified diene elastomer as described above, preferably at least 80 phr, and more preferentially still 100 phr of modified diene elastomer. The modified diene elastomer can consist of a mixture of several modified diene elastomers as described above.

According to an alternative form of the invention, the elastomer matrix can also comprise less than 25 phr, preferably less than 20 phr, of at least one diene elastomer other than the modified diene elastomer described above. Mention may be made, as complementary diene elastomer, of any diene elastomer, whether natural or synthetic. In particular, the diene elastomer can be selected from the group consisting of polybutadienes (BRs), natural rubber (NR), synthetic polyisoprenes (IRs), butadiene copolymers, isoprene copolymers and the mixtures of these elastomers. The butadiene copolymers are particularly selected from the group consisting of butadiene/styrene copolymers (SBRs).

In accordance with the invention, the rubber composition also comprises at least 80 phr of silica, preferentially at least 100 phr, and preferably at most 200 phr, more preferentially at most 150 phr, the optimum content being in a known way different according to the specific applications targeted.

The silica used can be any reinforcing silica known to a person skilled in the art, in particular any precipitated or fumed silica exhibiting a BET specific surface and also a CTAB specific surface both of less than 450 m$^2$/g, preferably from 30 to 400 m$^2$/g, in particular between 60 and 300 m$^2$/g, more preferably still between 130 and 300 m$^2$/g, indeed even between 130 and 250 m$^2$/g.

In addition to silica, it is possible to use any other type of reinforcing filler known for its capabilities in reinforcing a rubber composition which can be used in the manufacture of tire treads, for example carbon black or another reinforcing inorganic filler, or also a mixture of these fillers.

All carbon blacks, used individually or in the form of mixtures, are suitable as carbon blacks, in particular the blacks of the HAF, ISAF or SAF type conventionally used in the treads of tires ("tyre-grade" blacks). Mention will more particularly be made, among the latter, of the reinforcing carbon blacks of the 100, 200 or 300 series (ASTM grades), such as, for example, the N115, N134, N234, N326, N330, N339, N347 or N375 blacks.

"Reinforcing inorganic filler" should be understood, in the present patent application, by definition, as meaning any inorganic or mineral filler, whatever its colour and its origin (natural or synthetic), capable of reinforcing by itself alone, without means other than an intermediate coupling agent, a rubber composition intended for the manufacture of tires; such a filler is generally characterized, in a known way, by the presence of hydroxyl (—OH) groups at its surface.

Mineral fillers of the siliceous type, apart from silica (Sift), or of the aluminous type, or also reinforcing titanium oxides, for example described in U.S. Pat. Nos. 6,610,261 and 6,747,087, are suitable in particular as reinforcing inorganic fillers. Mention may in particular be made, among the mineral fillers of the aluminous type, of alumina (Al$_2$O$_3$) or aluminium (oxide) hydroxides.

Also suitable as reinforcing fillers are reinforcing fillers of another nature, in particular carbon black, provided that these reinforcing fillers are covered with a siliceous layer or else comprise, at their surface, functional sites, in particular hydroxyl sites, requiring the use of a coupling agent in order to establish the connection between the filler and the elastomer. Mention may be made, by way of example, for example, of carbon blacks for tires, such as described, for example, in the patent documents WO 96/37547 and WO 99/28380. The physical state in which the reinforcing inorganic filler, including the silica, is provided is not important, whether it is in the form of a powder, of microbeads, of granules, of beads or any other appropriate densified form. Of course, reinforcing inorganic filler is also understood to mean mixtures of different reinforcing fillers, in particular of highly dispersible siliceous fillers as described above.

According to an advantageous alternative form of the invention, the reinforcing filler is predominantly silica, that is to say that it comprises more than 50% by weight, of the total weight of the reinforcing filler, of silica.

According to this alternative form, when carbon black is also present, it can be used at a content of less than 20 phr, more preferentially of less than 10 phr, and at a content of greater than 0.5 phr, in particular of greater than or equal to 1 phr.

The use of silica as reinforcing filler may require the use of a coupling agent in order to establish the connection between the filler and the elastomer. It is then possible to use, as coupling agents, organosilanes, in particular alkoxysilane polysulfides or mercaptosilanes, or also at least bifunctional polyorganosiloxanes.

Such a coupling agent should not be confused with the modifying agent used for the synthesis of the modified diene elastomer described above.

When the composition according to the invention comprises a coupling agent, its amount depends on that of the reinforcing inorganic filler. Its content is easily adjusted by a person skilled in the art according to the content of this filler; it is typically of the order of 0.5% to 15% by weight, with respect to the amount of reinforcing inorganic filler other than carbon black, preferentially from 6% to 12% by weight.

The rubber composition according to the invention can also contain coupling activators, agents for covering the fillers or more generally processing aids capable, in a known way, by virtue of an improvement in the dispersion of the filler in the elastomer matrix and of a lowering of the viscosity of the composition, of improving its ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

The rubber compositions in accordance with the invention can also comprise reinforcing organic fillers which can replace all or part of the carbon blacks or of the other reinforcing inorganic fillers described above. Mention may be made, as examples of reinforcing organic fillers, of functionalized polyvinyl organic fillers, such as described in Applications WO-A-2006/069792, WO-A-2006/069793, WO-A-2008/003434 and WO-A-2008/003435.

The rubber composition according to the invention can also contain at least one plasticizer. In a way known to a person skilled in the art of tire rubber compositions, this plasticizer is preferably chosen from hydrocarbon resins with a high glass transition temperature (Tg), hydrocarbon resins with a low Tg, plasticizing oils and their mixtures. Preferably, the plasticizer is chosen from hydrocarbon resins with a high Tg, plasticizing oils and their mixtures.

According to an advantageous alternative form of the invention, the total content of plasticizer in the composition is greater than or equal to 20 phr, preferentially greater than or equal to 50 phr, and advantageously at most 100 phr.

By definition, a hydrocarbon resin with a high Tg is by definition a solid at ambient temperature and pressure (20° C., 1 atm), while a plasticizing oil is liquid at ambient temperature and a hydrocarbon resin with a low Tg is viscous at ambient temperature. The Tg is measured according to Standard ASTM D3418 (1999).

In a known way, the hydrocarbon resins with a high Tg are thermoplastic hydrocarbon resins, the Tg of which is greater than 20° C. The preferential hydrocarbon resins with a high Tg which can be used in the context of the invention are well known to a person skilled in the art and are commercially available.

The plasticizer can also contain a plasticizing oil (or extender oil) which is liquid at 20° C., referred to as "low Tg", that is to say which, by definition, exhibits a Tg of less than 20° C., preferably of less than 40° C.

Any extender oil, whether it is of aromatic or non-aromatic nature, known for its plasticizing properties with regard to elastomers can be used. At ambient temperature (20° C.), these oils, which are more or less viscous, are liquids (that is to say, as a reminder, substances which have the ability to eventually assume the shape of their container), unlike in particular hydrocarbon resins with a high Tg, which are by nature solids at ambient temperature.

Plasticizing oils selected from the group consisting of naphthenic oils (low- or high-viscosity, in particular hydrogenated or non-hydrogenated), paraffinic oils, MES (Medium Extracted Solvate) oils, TDAE (Treated Distillate Aromatic Extract) oils, RAE (Residual Aromatic Extract) oils, TRAE (Treated Residual Aromatic Extract) oils and SRAE (Safety Residual Aromatic Extract) oils, mineral oils, vegetable oils, ether plasticizers, ester plasticizers, phosphate plasticizers, sulfonate plasticizers and the mixtures of these compounds are particularly suitable.

The rubber composition in accordance with the invention can also comprise all or part of the usual additives and processing aids known to a person skilled in the art and generally used in rubber compositions for tires, in particular tread rubber compositions, such as, for example, non-reinforcing fillers, pigments, protective agents, such as antiozone waxes, chemical antiozonants or antioxidants, antifatigue agents, reinforcing resins (such as described, for example, in Application WO 02/10269) or a crosslinking system, for example based on sulfur and other vulcanization agents, and/or on peroxide and/or on bismaleimide.

According to very advantageous alternative forms of the invention, the rubber composition is such that:
  the modified diene elastomer described above exhibits at least one, at least two, at least three, at least four, at least five, at least six, at least seven, at least eight, at least nine and preferably all of the following characteristics:
    the macromolecules making up the modified diene elastomer comprise two silicon atoms and one nitrogen atom,
    the group comprising the nitrogen atom is a nitrogen atom substituted by a $C_1$-$C_4$ alkyl radical, preferably methyl or ethyl, in particular methyl,
    the spacer groups are saturated and linear divalent aliphatic radicals having from 3 to 8 carbon atoms;
    the alkoxy group(s) substituting one or more silicon atoms comprises 1 to 4 carbon atoms; preferably, it is a methoxy radical or an ethoxy radical;
    all or a part, preferably at least 50 mol %, of the alkoxy functional groups substituting one or more silicon atoms are hydrolysed to give hydroxyl groups;
    the diene elastomer is a butadiene/styrene copolymer;
    all or a part, preferably at least 70 mol %, of the ends of elastomer branches not bonded to a silicon atom are functionalized, with respect to the number of moles of chain end, by an amine functional group;
    the mean Mn of the elastomer branches is less than 150 000 g/mol, preferably from 40 000 g/mol to 100 000 g/mol;
    the modified diene elastomer comprises at least 50% by weight of branched macromolecules having at least three branches;
    the modified diene elastomer comprises at least 35% by weight of branched macromolecules having three branches.
  it comprises 20 phr or more, preferably 50 phr or more, of at least one plasticizer,
  it comprises a crosslinking or vulcanization system.

The rubber composition in accordance with the invention is manufactured in appropriate mixers using two successive preparation phases well known to a person skilled in the art:
  a first phase of thermomechanical working or kneading ("non-productive" phase), which can be carried out in a single thermomechanical stage during which all the necessary constituents, in particular the elastomer matrix, the fillers and the optional other various additives, with the exception of the crosslinking system, are introduced into an appropriate mixer, such as a standard internal mixer (for example of 'Banbury' type). The incorporation of the filler in the elastomer can be carried out in one or more goes by thermomechanically kneading.
  a second phase of mechanical working ("productive" phase), which is carried out in an external mixer, such as an open mill, after cooling the mixture obtained during the first non-productive phase down to a lower temperature, typically of less than 120° C., for example between 40° C. and 100° C. The crosslinking system is then incorporated and the combined mixture is then mixed for a few minutes, for example between 5 and 15 min.

The non-productive phase is carried out at high temperature, up to a maximum temperature of between 110° C. and 200° C., preferably between 130° C. and 185° C., for a period of time generally of between 2 and 10 minutes.

The final composition thus obtained is subsequently calendered, for example in the form of a sheet or of a plaque, in particular for a laboratory characterization, or also extruded in the form of a rubber semi-finished (or profiled) element which can be used, for example, as a vehicle tire tread.

The composition can be either in the raw state (before crosslinking or vulcanization) or in the cured state (after crosslinking or vulcanization), can be a semi-finished product which can be used in a tire.

The crosslinking of the composition can be carried out in a way known to a person skilled in the art, for example at a temperature of between 130° C. and 200° C., under pressure.

Due to the maintenance of the hysteresis/raw processing properties compromise despite a high content of filler which characterizes a reinforced rubber composition according to the invention, it should be noted that such a composition can constitute any semi-finished product of the tire and very particularly the tread, reducing in particular its rolling resistance, while improving its performance qualities related to the high content of reinforcing filler.

A final subject-matter of the invention is thus a tire comprising a semi-finished article constituted, in all or in part, by a composition according to the invention, in particular a tread.

A better understanding of the abovementioned characteristics of the present invention, and also others, will be obtained on reading the following description of several implementational examples of the invention, which are given by way of illustration and without limitation.

EXAMPLES

I—Measurements and Tests Used

Determination of the Value of the Mn of the Branch Before Coupling or Star-Branching by Size Exclusion Chromatography The SEC (Size Exclusion Chromatography) technique makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses (Mn) and weight-average molar masses (Mw) can be determined from commercial standards and the polydispersity index (PI=Mw/Mn) can be calculated via a "Moore" calibration.

There is no specific treatment of the polymer sample before analysis. The latter is simply dissolved in the elution solvent at a concentration of approximately 1 g·l$^{-1}$. The solution is then filtered through a filter with a porosity of 0.45 μm before injection.

The apparatus used is a Waters Alliance chromatographic line. The elution solvent is either tetrahydrofuran or tetrahydrofuran+1 vol % of diisopropylamine+1 vol % of triethylamine, the flow rate is 1 ml·min$^{-1}$, the temperature of the system is 35° C. and the analytical time is 30 min. A set of two Waters columns with the Styragel HT6E trade name is used. The volume of the solution of the polymer sample injected is 100 μl. The detector is a Waters 2410 differential refractometer and the software for making use of the chromatographic data is the Waters Empower system.

The calculated average molar masses are relative to a calibration curve produced for SBRs having the following microstructure: 25% by weight of units of styrene type, 23% by weight of units of 1,2-type and 50% by weight of units of trans-1,4-type.

Determination of the Contents of Linear Macromolecules and Branched Macromolecules by the High-Resolution Size Exclusion Chromatography (High-Resolution SEC) Technique The high-resolution SEC technique is used to determine the percentages by weight of the various populations of chains present in a polymer sample.

There is no specific treatment of the polymer sample before analysis. The latter is simply dissolved in the elution solvent at a concentration of approximately 1 g·l$^{-1}$. The solution is then filtered through a filter with a porosity of 0.45 μm before injection.

The apparatus used is a Waters Alliance 2695 chromatographic line. The elution solvent is tetrahydrofuran, the flow rate is 0.2 ml·min$^{-1}$ and the temperature of the system is 35° C. A set of three identical columns in series is used (Shodex, length 300 mm, diameter 8 mm). The number of theoretical plates of the set of columns is greater than 22 000. The volume of the solution of the polymer sample injected is 50 μl. The detector is a Waters 2414 differential refractometer and the software for making use of the chromatographic data is the Waters Empower system.

The calculated molar masses are relative to a calibration curve produced for SBRs having the following microstructure: 25% by weight of units of styrene type, 23% by weight of units of 1,2-type and 50% by weight of units of trans-1,4-type.

Determination of the Mooney Viscosity

For the polymers and the rubber compositions, the Mooney viscosities ML(1+4)100° C. are measured according to Standard ASTM D-1646.

Use is made of an oscillating consistometer as described in Standard ASTM D-1646. The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement after rotating for 4 minutes is measured. The Mooney plasticity ML(1+4) is expressed in "Mooney unit" (MU, with 1 MU=0.83 N·m).

Differential Calorimetry

The glass transition temperatures (Tg) of the elastomers are determined using a differential scanning calorimeter according to Standard ASTM D3418 (1999).

Dynamic Properties

The dynamic properties and in particular tan δ max are measured on a viscosity analyser (Metravib VA4000) according to Standard ASTM D 5992-96. The response of a sample of vulcanized composition (cylindrical test specimen with a thickness of 2 mm and a cross section of 79 mm$^2$), subjected to a simple alternating sinusoidal shear stress, at a frequency of 10 Hz, under standard temperature conditions (23° C.) according to Standard ASTM D 1349-99, is recorded. A strain amplitude sweep is carried out from 0.1% to 50% peak-to-peak (outward cycle) and then from 50% to 0.1% peak-to-peak (return cycle). The result more particularly made use of is the loss factor tan δ. For the return cycle, the maximum value of tan δ observed, denoted tan δ max, is indicated. This value is representative of the hysteresis of the material and in the present case of the rolling resistance: the smaller the value of tan δ max, the lower the rolling resistance.

II—Examples of Preparations of the Elastomers

Preparation of the Polymer A: Functional SBR—Control 1.74 kg of styrene and 5.84 kg of butadiene, and also 1.07 l of a 0.36 mol·l$^{-1}$ solution of tetrahydrofuran in methylcyclohexane, are injected into a 90-litre reactor, maintained under a nitrogen pressure of approximately 2 bar, containing 44 kg of methylcyclohexane. After neutralization of the impurities in the solution to be polymerized by addition of n-butyllithium, 716 ml of 0.06 mol·l$^{-1}$ n-butyllithium in methylcyclohexane are added. The polymerization is carried out at 50° C.

After 45 minutes, the degree of conversion of the monomers reaches 68%. This content is determined by weighing an extract dried at 140° C. under a reduced pressure of 200 mmHg. The value of the branch Mn before coupling, determined by SEC RI, is 120 000 g·mol$^{-1}$.

1.19 l of a 0.018 mol·l$^{-1}$ solution of N,N-dimethylaminopropyltrimethoxysilane in methylcyclohexane are then added (n (N,N-dimethylaminopropyltrimethoxysilane)/n (n-butyllithium)=0.5). The solution is stirred at a temperature of 50° C. for 30 minutes. The solution is subsequently antioxidized by addition of 0.8 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The Mooney viscosity of the polymer is 70.

The distribution of the 1 branch, 2 branch, 3 branch, 4 branch, 5 branch and 6 branch entities (1b/2b/3b/4b/5b/6b), determined by high-resolution SEC, is as follows: 10/87/2/1/0/0.

The glass transition temperature of this copolymer is −63° C.

Preparation of the Polymer B: Functional SBR According to the Invention 1.67 kg of styrene and 5.91 kg of butadiene, and also 1.01 l of a 0.36 mol·l$^{-1}$ solution of tetrahydrofuran in methylcyclohexane, are injected into a 90-litre reactor, maintained under a nitrogen pressure of approximately 2 bar, containing 43 kg of methylcyclohexane. After neutralization of the impurities in the solution to be polymerized by addition of n-butyllithium, 1628 ml of 0.06 mol·l$^{-1}$ n-butyllithium in methylcyclohexane are added. The polymerization is carried out at 50° C.

After 40 minutes, the degree of conversion of the monomers reaches 69%. This content is determined by weighing an extract dried at 140° C. under a reduced pressure of 200 mmHg. The value of the branch Mn before coupling, determined by SEC RI, is 52 000 g·mol$^{-1}$.

1.38 l of a 0.022 mol·l$^{-1}$ solution of bis(3-trimethoxysilylpropyl)-N-methylamine in methylcyclohexane are then added (n (bis(3-trimethoxysilylpropyl)-N-methylamine)/n (n-butyllithium)=0.3). The solution is stirred at a temperature of 50° C. for 30 minutes. The solution is subsequently antioxidized by addition of 0.8 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The copolymer thus treated is separated from its solution by a devolatilization operation in an oven.

The Mooney viscosity of the polymer is 38.

The distribution of the 1 branch, 2 branch, 3 branch, 4 branch, 5 branch and 6 branch entities (1b/2b/3b/4b/5b/6b), determined by high-resolution SEC, is as follows:

The glass transition temperature of this copolymer is −64° C.

Preparation of the Polymer C: Functional SBR According to the Invention 1.67 kg of styrene and 5.91 kg of butadiene, and also 1.01 l of a 0.36 mol·l$^{-1}$ solution of tetrahydrofuran in methylcyclohexane, are injected into a 90-litre reactor, maintained under a nitrogen pressure of approximately 2 bar, containing 44 kg of methylcyclohexane. After neutralization of the impurities in the solution to be polymerized by addition of n-butyllithium, 999 ml of 0.06 mol·l$^{-1}$ n-butyllithium in methylcyclohexane are added. The polymerization is carried out at 50° C.

After 42 minutes, the degree of conversion of the monomers reaches 68%. This content is determined by weighing an extract dried at 140° C. under a reduced pressure of 200 mmHg. The value of the branch Mn before coupling, determined by SEC RI, is 81 000 g·mol$^{-1}$.

0.76 l of a 0.022 mol·l$^{-1}$ solution of bis(3-trimethoxysilylpropyl)-N-methylamine in methylcyclohexane are then added (n (bis(3-trimethoxysilylpropyl)-N-methylamine)/n (n-butyllithium)=0.26). The solution is stirred at a temperature of 50° C. for 30 minutes. The solution is subsequently antioxidized by addition of 0.8 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The copolymer thus treated is separated from its solution by a devolatilization operation in an oven.

The Mooney viscosity of the polymer is 71.

The distribution of the 1 branch, 2 branch, 3 branch, 4 branch, 5 branch and 6 branch entities (1b/2b/3b/4b/5b/6b), determined by high-resolution SEC, is as follows: 3/5/39/50/4/0.

The glass transition temperature of this copolymer is −64° C.

Preparation of the Polymer D: SBR Amine-Functional at the End of Branches—Control 1.67 kg of styrene and 5.91 kg of butadiene, and also 1.01 l of a 0.36 mol·l$^{-1}$ solution of tetrahydrofuran in methylcyclohexane, are injected into a 90-litre reactor, maintained under a nitrogen pressure of approximately 2 bar, containing 44 kg of methylcyclohexane. After neutralization of the impurities in the solution to be polymerized by addition of n-butyllithium, 785 ml of 0.06 mol·l$^{-1}$ lithium hexamethylenimine in methylcyclohexane are added. The polymerization is carried out at 50° C.

After 49 minutes, the degree of conversion of the monomers reaches 70%. This content is determined by weighing an extract dried at 140° C. under a reduced pressure of 200 mmHg. The value of the branch Mn before coupling, determined by SEC RI, is 113 000 g·mol$^{-1}$.

1.22 l of a 0.018 mol·l$^{-1}$ solution of N,N-dimethylaminopropyltrimethoxysilane in methylcyclohexane are then added (n (N,N-dimethylaminopropyltrimethoxysilane)/n (lithium hexamethylenimine)=0.5). The solution is stirred at a temperature of 50° C. for 30 minutes. The solution is subsequently antioxidized by addition of 0.8 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The Mooney viscosity of the polymer is 62.

The distribution of the 1 branch, 2 branch, 3 branch, 4 branch, 5 branch and 6 branch entities (1b/2b/3b/4b/5b/6b), determined by high-resolution SEC, is as follows: 8/88/3/2/0/0.

The glass transition temperature of this copolymer is −63° C.

Preparation of the Polymer E: SBR Amine-Functional at the End of Branches According to the Invention 1.67 kg of styrene and 5.91 kg of butadiene, and also 1.01 l of a 0.36 mol·l$^{-1}$ solution of tetrahydrofuran in methylcyclohexane, are injected into a 90-litre reactor, maintained under a nitrogen pressure of approximately 2 bar, containing 43 kg of methylcyclohexane. After neutralization of the impurities in the solution to be polymerized by addition of n-butyllithium, 1376 ml of 0.06 mol·l$^{-1}$ lithium hexamethylenimine in methylcyclohexane are added. The polymerization is carried out at 50° C.

After 43 minutes, the degree of conversion of the monomers reaches 70%. This content is determined by weighing an extract dried at 140° C. under a reduced pressure of 200 mmHg. The value of the branch Mn before coupling, determined by SEC RI, is 52 000 g·mol$^{-1}$.

1.38 l of a 0.022 mol·l$^{-1}$ solution of bis(3-trimethoxysilylpropyl)-N-methylamine in methylcyclohexane are then added (n (bis(3-trimethoxysilylpropyl)-N-methylamine)/n (lithium hexamethylenimine)=0.3). The solution is stirred at a temperature of 50° C. for 30 minutes. The solution is subsequently antioxidized by addition of 0.8 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The copolymer thus treated is separated from its solution by a devolatilization operation in an oven.

The Mooney viscosity of the polymer is 48.

The distribution of the 1 branch, 2 branch, 3 branch, 4 branch, 5 branch and 6 branch entities (1b/2b/3b/4b/5b/6b), determined by high-resolution SEC, is as follows: 3/11/48/32/5/2.

The glass transition temperature of this copolymer is −64° C.

Preparation of the Polymer F: SBR Amine-Functional at the End of Branches According to the Invention 1.67 kg of styrene and 5.91 kg of butadiene, and also 1.01 l of a 0.36 mol·l$^{-1}$ solution of tetrahydrofuran in methylcyclohexane, are injected into a 90-litre reactor, maintained under a nitrogen pressure of approximately 2 bar, containing 44 kg of methylcyclohexane. After neutralization of the impurities in the solution to be polymerized by addition of n-butyllithium, 1096 ml of 0.06 mol·l$^{-1}$ lithium hexamethylenimine in methylcyclohexane are added. The polymerization is carried out at 50° C.

After 48 minutes, the degree of conversion of the monomers reaches 69%. This content is determined by weighing an extract dried at 140° C. under a reduced pressure of 200 mmHg. The value of the branch Mn before coupling, determined by SEC RI, is 86 000 g·mol$^{-1}$.

0.76 l of a 0.022 mol·l$^{-1}$ solution of bis(3-trimethoxysilylpropyl)-N-methylamine in methylcyclohexane are then added (n (bis(3-trimethoxysilylpropyl)-N-methylamine)/n (lithium hexamethylenimine)=0.27). The solution is stirred at a temperature of 50° C. for 30 minutes. The solution is subsequently antioxidized by addition of 0.8 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The copolymer thus treated is separated from its solution by a devolatilization operation in an oven.

The Mooney viscosity of the polymer is 86.

The distribution of the 1 branch, 2 branch, 3 branch, 4 branch, 5 branch and 6 branch entities (1b/2b/3b/4b/5b/6b), determined by high-resolution SEC, is as follows: 3/5/41/49/2/0.

The glass transition temperature of this copolymer is −63° C.

III—Examples of Preparations of the Rubber Compositions

The elastomers A to F have been used for the preparation of rubber compositions of tread type, each comprising silica as reinforcing filler according to two different formulations.

Each of the following compositions is produced, in a first step, by thermomechanical working and then, in a second finishing step, by mechanical working.

The following are successively introduced into a laboratory internal mixer of Banbury type, the capacity of which is 400 cm$^3$, which is 70% filled and which has a starting temperature of approximately 90° C.: the elastomer, two thirds of the silica, the black, the coupling agent and the oil, then, approximately one minute later, the remainder of the reinforcing filler, the resin, the antioxidant, the stearic acid and the antiozone wax and then, approximately two minutes later, the zinc monoxide.

The stage of thermomechanical working is carried out for 4 to 5 minutes, up to a maximum dropping temperature of approximately 160° C.

The abovementioned first step of thermomechanical working is thus carried out, it being specified that the mean speed of the blades during this first step is 50 rpm.

The mixture thus obtained is recovered and cooled and then, in an external mixer (homofinisher), the sulfur and the accelerator are added at 30° C., the combined mixture being further mixed for a time of 3 to 4 minutes (abovementioned second step of mechanical working).

The compositions thus obtained are subsequently calendered, either in the form of plaques (with a thickness ranging from 2 to 3 mm) or thin sheets of rubber, for the measurement of their physical or mechanical properties, or in the form of profiled elements which can be used directly, after cutting and/or assembling to the desired dimensions, for example as semi-finished products for tires, in particular for treads.

Crosslinking is carried out at 150° C. for 40 min.

Each of the compositions exhibits the following formulation (expressed in phr: parts per hundred parts of elastomer):

TABLE 1

| Ingredients | Formulation 1 | Formulation 2 |
| --- | --- | --- |
| Polymer | 100 | 100 |
| Silica | 110 | 70 |
| Carbon black | 3 | 3 |
| Oil | 13 | 0 |
| Resin | 59 | 46 |
| Coupling agent | 8.8 | 5.6 |
| Stearic acid | 3 | 3 |
| Zinc oxide | 1.5 | 1.5 |
| DPG | 2.3 | 1.5 |
| Soluble sulfur | 1 | 1 |
| Accelerator | 2.3 | 1.73 |
| Antioxidant | 3.6 | 2.8 |

Silica: Zeosil 1165MP from Rhodia, of HDS type.
Carbon black: ASTM N234 grade from Cabot Corporation
Oil: Sunflower oil comprising 85% by weight of oleic acid, Lubrirob Tod 1880 from Novance
Resin: Aromatic DCPD resin, Escorez 5600 or PR383, from ExxonMobil
Coupling agent: Silane TESPT Si69 from Degussa
DPG: Diphenylguanidine (Perkacit DPG from Flexsys)
Accelerator: CBS: N-Cyclohexyl-2-benzothiazolesulfenamide (Santocure CBS from Flexsys)
Antioxidant: N-(1,3-Dimethylbutyl)-N'-phenyl-p-phenylenediamine, from Flexsys These two formulations exhibit, as main difference, the content of filler. The other differences are adjustments known to a person skilled in the art when the content of filler is modified. Thus, the total content of plasticizer (oil+resin) is increased with the content of filler in order to retain a modulus which is not too high. The content of silane and of DPG is also adjusted to the content of silica filler.

IV—Results

The performance index is calculated according to the following formula: 100/(value of tan delta*value of Mooney mixture).

The higher this index, the lower the rolling resistance and/or the lower the viscosity of the mixture, thus the easier the processing.

|   | Polymer | Tan delta 23° C. Formulation 1 | Mooney mixture Formulation 1 | Performance index Formulation 1 | Tan delta 23° C. Formulation 2 | Mooney mixture Formulation 2 | Performance index Formulation 2 |
|---|---|---|---|---|---|---|---|
| A | Control | 0.146 | 74 | 9.3 | 0.234 | 64 | 6.7 |
| B | Invention | 0.147 | 59 | 11.5 | 0.231 | 47 | 9.2 |
| C | Invention | 0.181 | 43 | 12.8 | 0.23 | 34 | 12.8 |
| D | Control/amine functional group at the end of branches | 0.130 | 90 | 8.5 | 0.226 | 86 | 5.1 |
| E | Invention/amine functional group at the end of branches | 0.127 | 86 | 9.2 | 0.193 | 77 | 6.7 |
| F | Invention/amine functional group at the end of branches | 0.145 | 62 | 11.1 | 0.185 | 70 | 7.7 |

The examples above show that:

On comparing the composition 1A and the composition 1B, the elastomer according to the invention exhibits a better performance index than the control elastomer On comparing the composition 2A and the composition 2B, the elastomer according to the invention exhibits a better performance index.

Thus, the elastomer according to the invention exhibits a better performance index whatever the formulation and the content of filler used.

On comparing 1D and 1E, the elastomer according to the invention exhibits an improved performance compromise in comparison with this control, which also comprises an amine functional group at the chain end.

On comparing 2D and 2E, the elastomer according to the invention also exhibits an improved performance index in comparison with this control, which also comprises an amine functional group at the chain end.

Thus, the polymer according to the invention with an amine functional group at the chain end exhibits an improved performance in comparison with a polymer which exhibits an amine at the chain end but is not according to the invention.

On comparing 1B and 2B, it is also noticed that the performance index of the polymer according to the invention is higher in the formulation 1 exhibiting the highest content of silica filler.

On comparing 1E and 2E, it is concluded that the elastomer with an amine functional group at the chain end according to the invention exhibits an improved performance index in the formulation 1 having a high content of filler.

Finally, on comparing 1B and 1E, it is observed that the polymer according to the invention is particularly useful for achieving a low tan delta 23° C. value, i.e. a low rolling resistance, when the polymer exhibits an amine functional group at the chain end.

The above examples show that the compositions comprising a modified diene elastomer according to the invention have a better low tan delta/low Mooney mixture compromise than the compositions comprising a modified diene elastomer of the prior art, but above all that this gain in terms of the hysteresis/Mooney compromise is all the greater as the formulation contains a high content of silica.

This gain is also all the greater as the specific polymer contains an amine functional group at the end of the branches.

Consequently, the use of a rubber composition according to the invention comprising a high content of silica, of greater than or equal to 80 phr, and a specific modified elastomer unexpectedly makes it possible to maintain a low tan delta/low Mooney compromise, in comparison with a composition comprising a lower content of silica. The invention thus makes it possible to benefit from certain performance qualities of the tire which are directly linked to the increase in the content of reinforcing filler, while minimizing the effect of this high content on the properties of processing of the compositions and of hysteresis of the latter, thus of rolling resistance of the tire.

The invention claimed is:

1. A rubber composition based at least on a reinforcing filler comprising silica and on an elastomer matrix comprising a modified diene elastomer, wherein:
   the content of silica is greater than or equal to 80 phr,
   the content of modified diene elastomer is greater than or equal to 75 phr, and
   the modified diene elastomer comprises macromolecules comprising, within their structure, an n-functional branching unit, n having a value of at least 1 and of at most 9, consisting of a group comprising at least two silicon atoms which are substituted by elastomer branches and connected together via a group comprising at least one nitrogen atom, the bonds between silicon and nitrogen atoms being produced via a spacer group, wherein the macromolecules making up the modified diene elastomer correspond to the following formula I:

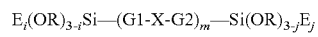

in which:
E represents a diene elastomer branch,
the R radicals represent, independently of one another, a $C_1$-$C_{10}$ alkyl radical,
G1 and G2 represent, independently of one another, a saturated or unsaturated, linear or branched, cyclic or non-cyclic, divalent aliphatic $C_1$-$C_{18}$ hydrocarbon radical;
X represents a group comprising at least one nitrogen atom;

i and j are, independently of one another, integers varying from 0 to 3, with i+j equal to at least 1, and m is an integer varying from 1 to 20, and wherein the modified diene elastomer comprises at least 35% by weight of branched macromolecules having three branches, with respect to the total weight of the modified diene elastomer.

2. The rubber composition according to claim 1, wherein the elastomer branches of the modified diene elastomer have a number-average molar mass (Mn) ranging from 40,000 g/mol to 100,000 g/mol.

3. The rubber composition according to claim 1, wherein all or part of the alkoxy groups borne by the modified diene elastomer are hydrolysed to give hydroxyl groups.

4. The rubber composition according to claim 1, wherein the macromolecules making up the modified diene elastomer correspond to the formula I in which m has the value 1 and X represents a group chosen from:

(1) a group of formula II:

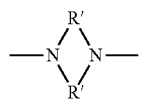

with the R' groups, which are identical or different, representing a linear or branched divalent aliphatic $C_1$-$C_{18}$ radical;

(2) a>N-G3-SiR''$_a$E$_k$(OR)$_{3-a-k}$ group
with

G3 representing a saturated or unsaturated, linear or branched, cyclic or noncyclic, divalent aliphatic $C_1$-$C_{18}$, hydrocarbon radical R'' representing a $C_1$-$C_4$ alkyl radical, and the R radicals representing, independently of one another, a $C_1$-$C_{10}$ a representing an integer having the value 0 or 1 and k an integer varying from 0 to 3, with a+k less than or equal to 3, with the proviso that i+j+k is at least equal to 1 and at most to 9, (3) a>N—Y group,
with Y representing a $C_1$-$C_4$ alkyl radical, or a $C_6$-$C_{18}$ aryl radical, or a hydrogen atom, or an -R1-A group, with R1 representing a linear or branched divalent hydrocarbon group having 1 to 18 carbon atoms and A being a group comprising a nitrogen atom.

5. The rubber composition according to claim 4, wherein the macromolecules making up the modified diene elastomer correspond to the formula I in which m has the value 1 and X represents a>N—Y group, with Y representing a $C_1$-$C_4$ alkyl radical.

6. The rubber composition according to claim 1, wherein the macromolecules making up the modified diene elastomer correspond to the formula I in which E represents a diene elastomer branch bearing, at the chain end, a group comprising a nitrogen atom.

7. The rubber composition according to claim 1, wherein the modified diene elastomer comprises at least 50% by weight of branched macromolecules, with respect to the total weight of the modified diene elastomer.

8. The rubber composition according to claim 1, wherein the modified diene elastomer comprises at most 25% by weight of branched macromolecules having four and more branches, with respect to the total weight of the modified diene elastomer.

9. The rubber composition according to claim 1, wherein at least one of the following characteristics is observed:

the macromolecules making up the modified diene elastomer comprise two silicon atoms and one nitrogen atom, the group comprising the nitrogen atom is a nitrogen atom substituted by a $C_1$-$C_4$ alkyl radical, the spacer groups are saturated and linear divalent aliphatic radicals having from 3 to 8 carbon atoms;

the alkoxy group(s) substituting one or more silicon atoms comprises 1 to 4 carbon atoms;

all or a part of the alkoxy functional groups substituting one or more silicon atoms are hydrolysed to give hydroxyl groups;

the diene elastomer is a butadiene/styrene copolymer;

all or a part of the ends of elastomer branches not bonded to a silicon atom are functionalized, with respect to the number of moles of chain end, by an amine functional group;

the mean Mn of the elastomer branches is less than 150 000 g/mol;

the modified diene elastomer comprises at least 50% by weight of branched macromolecules having at least three branches;

the modified diene elastomer comprises at least 35% by weight of branched macromolecules having three branches.

10. A tire comprising a semi-finished article constituted, in all or in part, by a composition according to claim 1.

11. The rubber composition according to claim 1, wherein the content of silica is greater than or equal to 100 phr.

12. The rubber composition according to claim 1, wherein the n of the n-functional branching unit has a value of at most 6.

13. The rubber composition according to claim 1, wherein the spacer group is a linear or branched divalent aliphatic $C_1$-$C_{10}$ hydrocarbon radical.

14. The rubber composition according to claim 1, wherein the spacer group is a linear divalent $C_3$-$C_8$ hydrocarbon radical.

* * * * *